United States Patent
Watanave et al.

(10) Patent No.: US 7,752,161 B2
(45) Date of Patent: Jul. 6, 2010

(54) ACCESS MANAGEMENT SYSTEM, ACCESS ADMINISTRATION APPARATUS, ACCESS ADMINISTRATION PROGRAM, ACCESS ADMINISTRATION METHOD, AND RECORDING MEDIUM

(75) Inventors: Yuji Watanave, Tokyo-to (JP); Masayuki Numao, Kawasaki (JP); Madoka Yuriyama, Fujisawa (JP); Keitaroh Dohmen, Yamato (JP)

(73) Assignee: International Business Machines Coporation, Armonk, NY (US)

( * ) Notice: Subject to any disclaimer, the term of this patent is extended or adjusted under 35 U.S.C. 154(b) by 934 days.

(21) Appl. No.: 10/958,322

(22) Filed: Oct. 6, 2004

(65) Prior Publication Data
US 2005/0097349 A1 May 5, 2005

(30) Foreign Application Priority Data
Oct. 29, 2003 (JP) ............................. 2003-368518

(51) Int. Cl.
G06F 7/00 (2006.01)
G06F 17/30 (2006.01)

(52) U.S. Cl. ................. 707/3; 705/1; 705/5; 705/26; 705/59; 707/2; 707/9; 707/10; 707/100; 707/101; 709/220; 709/225; 709/229; 714/712; 726/1; 726/2; 726/4; 726/26

(58) Field of Classification Search ................. 713/156; 707/9; 709/226, 233; 726/4, 2, 26
See application file for complete search history.

(56) References Cited

U.S. PATENT DOCUMENTS

| 5,235,642 | A  | * | 8/1993  | Wobber et al. | 713/156 |
| 6,397,336 | B2 | * | 5/2002  | Leppek | 726/4 |
| 6,647,388 | B2 | * | 11/2003 | Numao et al. | 707/9 |
| 6,957,261 | B2 | * | 10/2005 | Lortz | 709/226 |
| 7,013,332 | B2 | * | 3/2006  | Friedel et al. | 709/223 |
| 7,222,361 | B2 | * | 5/2007  | Kemper | 726/4 |
| 2004/0153908 | A1 | * | 8/2004 | Schiavone et al. | 714/712 |
| 2005/0033757 | A1 | * | 2/2005 | Greenblatt et al. | 707/100 |

\* cited by examiner

Primary Examiner—William R Korzuch
Assistant Examiner—Bryan Wright
(74) Attorney, Agent, or Firm—Gibb I.P. Law Firm, LLC

(57) ABSTRACT

An access management system includes an access administration apparatus which permits access to a database when the access request satisfies an access permission condition, and a policy determination apparatus which determines whether the access permission condition is satisfied by the access request; in which the access administration apparatus stores decision information containing a decision as to whether the access permission condition is satisfied, determines that the access request satisfies the access permission condition if the decision information has a predetermined inclusion relation with the access request, receives a decision as to whether the access permission condition is satisfied by the access request from the policy determination apparatus if it is determined that the decision information does not have the inclusion relation with the access request, and permits access to the database if it is determined that the access request satisfies the access permission condition.

9 Claims, 6 Drawing Sheets

Figure 2

| # | Name | Age | Sex | Address | ~ | 100 |
|---|---|---|---|---|---|---|
| 1 | A | 12 | Female | ..., Tokyo | ~ | |
| 2 | B | 25 | Male | ..., Kanagawa | ~ | |
| 3 | C | 38 | Male | ..., Osaka | ~ | |
| 4 | D | 37 | Female | ..., Osaka | ~ | |
| ~ | ~ | ~ | ~ | ~ | ~ | |

Figure 3

$S_1 = G_1$ and $P_1$ and $T_1$ (=1) and $C_1$ ( $C_{11}$ and $C_{12}$ and $C_{13}$ )

$S_2 = G_2$ and $P_2$ and $T_2$ (=0) and $S_3 = G_3$ and $P_3$ and $T_3$ (=1) and $C_3$ $\boxed{C_{31}}$ $S_4 = G_4$ and $P_4$ and $T_4$ (=0) and $S_5 = G_5$ and $P_5$ and $T_5$ (=1) and $C_5$ $\boxed{C_{51}}$ $F(u, p, t, s) = ( S_1$ or $S_2$ or $S_3$ ) and ( $S_4$ or $S_5$ )

Figure 4

| # | u | p | t | $z_{11}$ | $z_{12}$ | $z_{13}$ | $z_{31}$ | $z_{51}$ | F(u,p,t,s) | V | 135 |
|---|---|---|---|---|---|---|---|---|---|---|---|
| 1 | A | To send DM | Address | 1 | 1 | 1 | 0 | 1 | 0 | 1 | |
| 2 | A | To send DM | Address | 1 | 0 | 1 | 1 | 1 | 1 | 1 | |
| 3 | A | To send DM | Address | 1 | 1 | 0 | 0 | 0 | 0 | 1 | |
| 4 | A | To send DM | Address | 1 | 1 | 1 | 1 | 1 | 1 | 0 | |
| 5 | A | To send DM | Address | 1 | 0 | 0 | 1 | 1 | 1 | 0 | |

ACCESS MANAGEMENT SYSTEM, ACCESS ADMINISTRATION APPARATUS, ACCESS ADMINISTRATION PROGRAM, ACCESS ADMINISTRATION METHOD, AND RECORDING MEDIUM

FIELD OF THE INVENTION

The present invention relates to an access management system, access administration apparatus, access administration program, access administration method, and recording medium. More particularly, it relates to an access management system which accesses a database based on a request to access the database when the access request satisfies a predetermined access permission condition as well as to an access administration apparatus, access administration program, access administration method, and recording medium.

BACKGROUND ART

With the recent spread of electronic commerce and integration of intra-company systems, it has become necessary to share personal information, confidential information, etc. while protecting the privacy of customers. To protect personal information, it is internationally recommended to use information systems based on eight OECD principles. Thus, any company that builds an information system should desirably work out a privacy policy and ensure that the information system will access personal information properly based on the privacy policy.

In such an information system, generally servers are equipped with a policy determination function for determining, based on a privacy policy, whether personal information may be accessed while clients are provided with an access administration function for performing access control based on decisions by the policy determination function as well as with personal information.

Incidentally, description of prior art documents will be omitted because no such document is known to exist at present.

PROBLEMS TO BE SOLVED BY THE INVENTION

The policy determination function is normally performed on a single server in order to manage privacy policies collectively. Consequently, in a large information system, a large number of access administration functions accessing the policy determination function intensively will creates a bottleneck for the server on which the policy determination function is implemented, lowering the processing performance of the server.

To solve the above problem, the present invention provides an access management system which accesses a database based on a request to access the database when the access request satisfies a predetermined access permission condition. This object is achieved by a combination of features set forth in the independent Claims herein. The dependent Claims further present advantageous concrete examples of the present invention.

SUMMARY OF THE INVENTION

According to one aspect, the present invention provides an access management system which accesses a database based on a request to access the database when the access request satisfies a predetermined access permission condition, wherein the access permission condition is satisfied if all the subconditions contained in a predetermined first set of subconditions are satisfied from among a plurality of subconditions which are elements of the access permission condition, the access management system comprising: an access administration apparatus which receives the access request and permits access to the database when the access request satisfies the access permission condition, the access administration apparatus having: (i) a decision storage which stores decision information by associating the decisions related to the plurality of subconditions with a corresponding decision related to the access permission condition of the decisions; (ii) a subcondition-based determination unit which outputs decisions as to whether the access request satisfies each of the plurality of subconditions; (iii) an inclusion relation determination unit which determines that the access request satisfies the access permission condition if the decision information has a first inclusion relation with the access request when a decision about the access request in relation to at least one of the subconditions differs from a decision related to the subcondition and contained in the decision information, where the first inclusion relation is a relation in which all the subconditions satisfied in the decision information are satisfied by the access request and the access permission condition is satisfied in the decision information; (iv) a decision acquisition unit which sends the access-permission-condition-based determination request to the policy determination apparatus and receives a decision as to whether the access permission condition is satisfied by the access request from the policy determination apparatus if it is determined that the decision information does not have the first inclusion relation with the access request; and (v) an access processor which permits access to the database if it is determined that the access request satisfies the access permission condition; and a policy determination apparatus which receives, from the access administration apparatus, an access-permission-condition-based determination request containing decisions as to whether the plurality of subconditions are satisfied by the access request and returns a decision as to whether the access permission condition is satisfied by the access request.

Incidentally, the above summary of the invention does not enumerate all the necessary features of the present invention, and subcombinations of above features can also constitute inventions.

ADVANTAGES OF THE INVENTION

The present invention can prevent determination of privacy policies from becoming a bottleneck in an information system which accesses private information properly based on the privacy policies.

BRIEF DESCRIPTION OF THE DRAWINGS

FIG. 2 shows an example of a database 100 according to this embodiment in a tabular form;

FIG. 3 shows an example of an access permission condition according to this embodiment;

FIG. 4 shows an example of a decision storage 135 according to this embodiment in a tabular form;

PREFERRED EMBODIMENT

The present invention will be described below by way of an embodiment of the invention, but the embodiment below is not intended to limit the Claimed invention and not all of combinations of the features described in the embodiment is necessarily essential for the solution of the invention.

Figure 1:
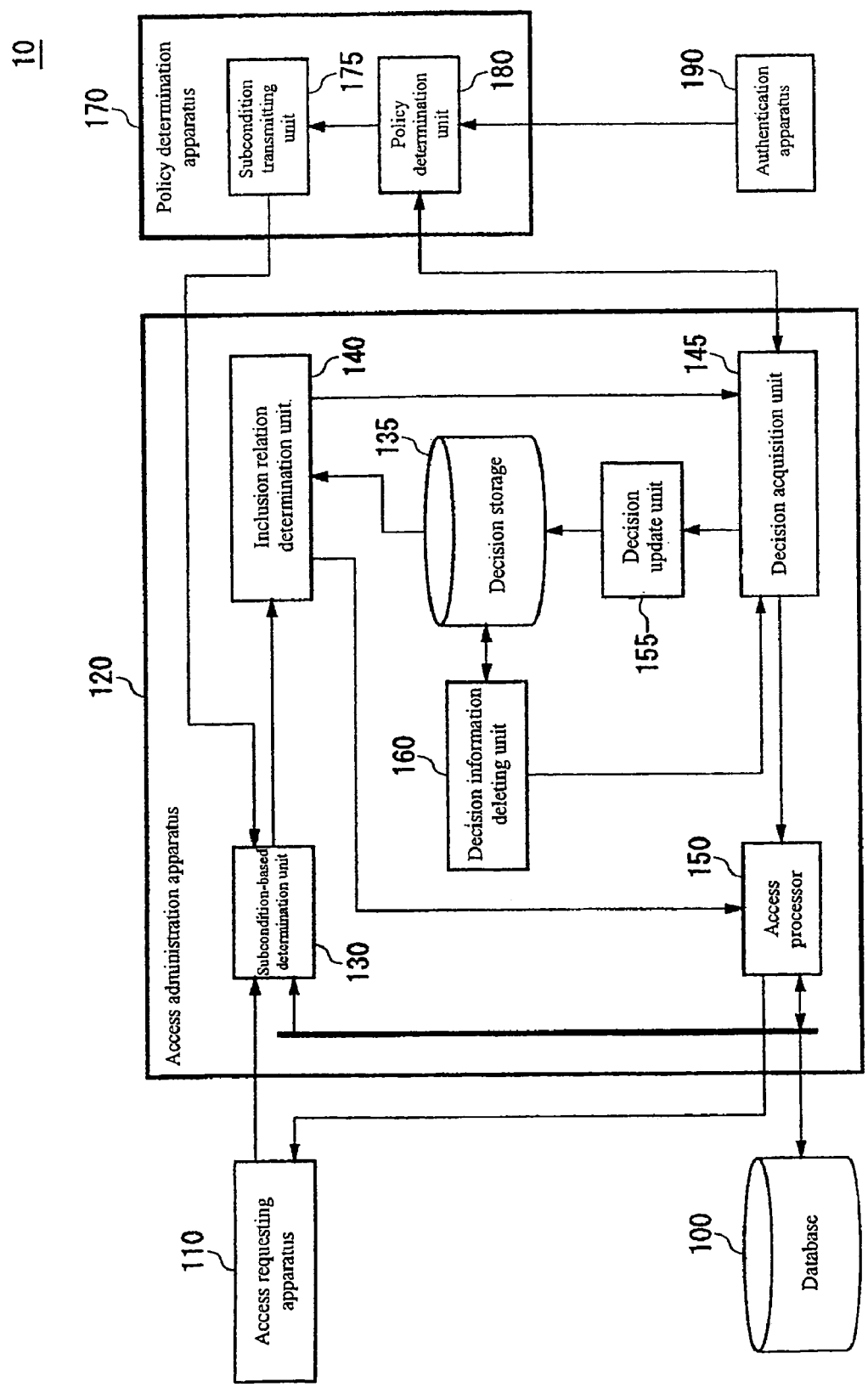
FIG. 1 shows a configuration of an access management system 10 according to this embodiment.

FIG. 1 shows a configuration of an access management system 10 according to this embodiment. The access management system 10 according to this embodiment accesses a database 100 based on a request to access the database 100 when the access request satisfies a predetermined access permission condition. When a plurality of accesses satisfy a predetermined relation, the access management system 10 can reduce throughput of a policy determination function by evaluating a decision about a second access within an access administration function using a decision about a first access obtained from the policy determination function.

According to this embodiment, the access permission condition is expressed by AND/OR operations of a plurality of subconditions which are elements of the access permission condition and does not contain a NOT operation of any subconditions. Specifically, for example, given a plurality of subconditions $\{C1, C2, C3, C4, C5\}$, if AND is expressed by "×" and OR is expressed by "+," an access permission condition F is given by $F1=C1 \times C2 \times C4+C3 \times C5$ using disjunctive/conjunctive normal form without a NOT operation of subconditions.

Such an access permission condition is satisfied when all the subconditions contained in a predetermined set of subconditions are satisfied from among a plurality of subconditions regardless of whether subconditions not contained in the set of subconditions are satisfied. Thus, in the above example, when all the subconditions contained in the set of subconditions $\{C1, C2, C4\}$ contained in the first term are satisfied, the access permission condition is true regardless of whether or not the subconditions $\{C3, C5\}$ not contained in the set are satisfied. Similarly, when all the subconditions contained in the set of subconditions $\{C3, C5\}$ contained in the second term are satisfied, the access permission condition is true regardless of whether or not the subconditions $\{C1, C2, C4\}$ not contained in the set are satisfied.

On the other hand, the access permission condition is not satisfied unless all the subconditions contained in a predetermined set of subconditions are satisfied from among a plurality of subconditions which are elements of the access permission condition. Specifically, in the above example, unless all the subconditions contained in a set of the subconditions $\{C4, C5\}$ are satisfied, the access permission condition is false regardless of whether or not the subconditions $\{C1, C2, C3\}$ not contained in the set are satisfied.

Based on the above characteristics of the access permission condition, if a second access request satisfies all the subconditions satisfied by a first access request and if the first access request satisfies the access permission condition, the access management system 10 according to this embodiment determines that the second access request satisfies the access permission condition in an access administration function. Similarly, if the second access request does not satisfy any of the subconditions not satisfied by the first access request and if the first access request does not satisfy the access permission condition, the access management system 10 determines that the second access request does not satisfy the access permission condition in the access administration function.

The access management system 10 comprises the database 100, an access requesting apparatus 110, an access administration apparatus 120, a policy determination apparatus 170, and an authentication apparatus 190. As illustrated in FIG. 2, the database 100 stores personal information about a plurality of individuals including their name, age, sex, and/or address. As personal information, the database 100 may store information about customers, employees, etc. of a company which uses the access management system 10. Alternatively, the database 100 may store, confidential information managed by each of a plurality of employees in a manner similar to the one shown in FIG. 2 instead of personal information.

The access requesting apparatus 110 sends an access request to the access administration apparatus 120 on instructions from a user of the access requesting apparatus 110 or an application program running on the access requesting apparatus 110. The access administration apparatus 120 has the access administration function for receiving an access request from the access requesting apparatus 110 and permitting access to the database 100 if the access request satisfies the access permission condition. If the access administration apparatus 120 cannot determine by itself whether the access request satisfies the access permission condition, it sends an access-permission-condition-based determination request to a policy determination apparatus 170, requesting the policy determination apparatus 170 to determine whether the access request satisfies the access permission condition.

The policy determination apparatus 170 has a policy determination function for receiving the access-permission-condition-based determination request from the access administration apparatus 120 and returning decision as to whether the access request satisfies the access permission condition to the access administration apparatus 120. The authentication apparatus 190 authenticates the user of the access requesting apparatus 110 or the application program running on the access requesting apparatus 110.

The access administration apparatus 120 comprises a subcondition-based determination unit 130, decision storage 135, inclusion relation determination unit 140, decision acquisition unit 145, access processor 150, decision update unit 155, and decision information deleting unit 160. The subcondition-based determination unit 130 outputs decisions as to whether the access request satisfies each of the plurality of subconditions. Regarding subconditions related to personal information, the subcondition-based determination unit 130 makes determinations by referring to the personal information stored in the database 100. In relation to the access request already checked by the policy determination apparatus 170 for compliance with the access permission condition, the decision storage 135 stores the decision information by associating the decisions made based on the plurality of subconditions with the corresponding decision made based on the access permission condition of the decisions.

Based on the decision information stored in the decision storage 135 and decisions as to whether the plurality of subconditions are satisfied by the access request received from the access requesting apparatus 110, the inclusion relation determination unit 140 determines whether it is possible to check for compliance with the access permission condition within the access administration apparatus 120. If it is found that compliance with the access permission condition cannot be checked within the access administration apparatus 120, the decision acquisition unit 145 sends the policy determination apparatus 170 an access-permission-condition-based determination request together with the decisions as to whether the plurality of subconditions are satisfied by the access request received from the access requesting apparatus 110, and receives a decision as to whether the access permission condition is satisfied by the access request from the policy determination apparatus 170. If the inclusion relation determination unit 140 or policy determination apparatus 170 determines that the access request satisfies the access permission condition, the access processor 150 permits access to the database 100 in response to the access request. Then, based on the access request, the access processor 150 accesses the database 100 and sends the results to the access requesting apparatus 110.

When the decision acquisition unit 145 receives a decision as to whether an access permission condition is satisfied by the access request, the decision update unit 155 stores decision information in the decision storage 135 by associating the decisions as to whether a plurality of subconditions are satisfied by the access request with the decision as to whether the access permission condition is satisfied by the access request. The decision information deleting unit 160 deletes redundant decision information stored in the decision storage 135.

The policy determination apparatus 170 comprises a subcondition transmitting unit 175 and policy determination unit 180. The subcondition transmitting unit 175 sends subcondition functions which prescribe respective subconditions to the subcondition-based determination unit 130 of the access administration apparatus 120 during initialization and the like of the access administration apparatus 120. Upon receiving an access-permission-condition-based determination request from the decision acquisition unit 145 of the access administration apparatus 120, the policy determination unit 180 returns a decision as to whether the appropriate access request satisfies the access permission condition. In making this decision, the policy determination unit 180 refers to a result of an authentication check performed by the authentication apparatus 190 on the user of the access requesting apparatus 110 or the application program running on the access requesting apparatus 110. If the authentication is successful, the authentication apparatus 190 permits the user or application program of the access requesting apparatus 110 to connect to the access administration apparatus 120.

Incidentally, the access management system 10 may be configured such that a plurality of access administration apparatus 120 request the policy determination apparatus 170 to determine whether an access permission condition is satisfied. Besides, at least two of the database 100, the access requesting apparatus 110, and the access administration apparatus 120 may be implemented on the same client computer. Also, the access administration apparatus 120 and policy determination apparatus 170 may be implemented on the same computer.

FIG. 3 shows an example of an access permission condition according to this embodiment. The privacy policy determined by the policy determination unit 180 is prescribed as an access permission condition consisting of a plurality of statements Si (i=1, 2, 3, . . . ) connected by AND/OR operators. The truth or falseness of each statement is a function determined based on a user group to which the sender of the access request belongs, the purpose for which personal information will be use, the type of data to be accessed, and usage conditions of data according to the contents of the personal information.

More specifically, each statement Si is true when all the following functions are true, i.e., all of them are satisfied: namely, a user group determination function Gi for determining whether the statement is applied to the user group to which the access requester belongs, purpose determination function Pi for determining whether the purpose for which the personal information will be used matches the purpose of use prescribed by the statement, data type determination function Ti for determining whether the type of data to be accessed matches the type of data prescribed by the statement, and data usage condition determination function Ci for determining whether the personal information to be accessed satisfy the usage conditions of the data prescribed by the statement. The data usage condition determination function Ci is prescribed by one or more subconditions Cij (j=1, 2, 3, . . . ) ANDed together.

A policy determination function F (u, p, t, s) for evaluating an access permission condition accepts inputs of the user u sending the access request, purpose of use p, type of data t to be accessed, and subject s that identifies the personal information to be accessed. This function is prescribed by a plurality of statements connected by AND/OR operators. According to this embodiment, the user u is identified by certification information of the user issued by the authentication apparatus 190 when the user of the access requesting apparatus 110 or the application program running on the access requesting apparatus 110 is authenticated. The purpose of use p is identified by the application name, method name, transaction name, or the like of an application program or the like accessing the database 100. The type of data t to be accessed and the subject s are identified based on key values or the like which identify an item name and personal information for which the access request is made.

The access management system 10 accepts inputs of (u, p, t, s) and determines whether an access permission condition F (u, p, t, s) is satisfied. More specifically, upon receiving an access request from the access requesting apparatus 110, the subcondition-based determination unit 130 of the access administration apparatus 120 acquires (u, p, t, s) about the received access request. Next, based on contents of the personal information specified by the subject s among the personal information about a plurality of individuals stored in the database 100, the subcondition-based determination unit 130 determines whether each of the plurality of subconditions Cij contained in the data usage condition determination function Ci is satisfied. Since these subconditions include those which require determinations to be made based on personal information such as "20 years of age or older," if determinations are made within the access administration apparatus 120, it is possible to eliminate the need for the policy determination unit 180 of the policy determination apparatus 170 to refer to the database 100 in relation to every access request.

If it is found that determination as to whether the access permission condition is satisfied cannot be made within the access administration apparatus 120, the decision acquisition unit 145 sends an access-permission-condition-based determination request including (u, p, t, Zts) (where Zts indicates a set of decisions as to whether the plurality of subconditions Cij are satisfied) to the policy determination unit 180. Upon receiving the access-permission-condition-based determination request, the policy determination unit 180 determines, based on (u, p, t), whether the access request satisfies the user group determination function Gi, purpose determination function Pi, and data type determination function Ti, and returns decisions F (u, p, t, s) concerning the access permission condition.

With the policy determination function F (u, p, t, s) shown in FIG. 3, the access permission condition is true when any of the statements S1, S2, and S3 and any of the statements S4 and S5 are true. Since each statement is represented by the user group determination function Gi, purpose determination function Pi, data type determination function Ti, and subconditions Cij connected by AND operators, the access permission condition is satisfied when all the subconditions Cij contained in all the statements in each of the statement combinations {S1, S4}, {S1, S5}, {S2, S4}, {S2, S5}, {S3, S4}, and {S3, S5} determined based on the policy determination function are satisfied regardless of truth or falseness of the subconditions Cij contained in the other statements.

Thus, for example, if the decisions zij as to whether a first access request satisfies the plurality of subconditions Cij are given by {z11, z12, z13, z31, z51}=(1, 0, 0, 1, 1) (where 1=True and 0=False) and the decision as to whether the first access request satisfies the access permission condition is True, the decision as to whether a second access request satisfies the access permission condition is True in view of the nature of the policy determination function regardless of whether z12 and z13 are True or False. Here, assuming that determination conditions other than the plurality of subconditions which are elements of the access permission condition are fixed, let's consider the fixed (u, p, t). If, for example, {z11, z12, z13, z31, z51}=(1, 0, 1, 1, 1) holds for the second access request, the inclusion relation determination unit 140 can determine that the second access request satisfies the access permission condition, based on the decision information related to the first access request and stored in the decision storage 135. That is, the inclusion relation determination unit 140 determines that the access request satisfies the access permission condition if the decision information stored in the decision storage 135 has a first inclusion relation with the access request when a decision about the access request in relation to at least one of the subconditions differs from a decision related to the subcondition and contained in the decision information, where the first inclusion relation is a relation in which all the subconditions satisfied in the decision information are satisfied by the access request and the access permission condition is satisfied in the decision information. According to this embodiment when the decision information has the first inclusion relation with the access request, it is said that the set Zts of decisions related to the plurality of subconditions and contained in the decision information includes a set Zts' of decisions about the access request in relation to the plurality of subconditions.

Similarly, with the policy determination function F (u, p, t, s) shown in FIG. 3, the access permission condition is not satisfied unless all the subconditions Cij contained in all the statements in each of the statement combinations {S1, S2, S3} and {S4, S5} determined based on the policy determination function are satisfied regardless of truth or falseness of subconditions Cij contained in the other statements.

Thus, for example, if {z11, z12, z13, z31, z51}=(1, 0, 0, 0, 1) holds for the first access request and the decision as to whether the first access request satisfies the access permission condition is False, the decision as to whether a first access request satisfies the access permission condition is False in view of the nature of the policy determination function regardless of whether z11 and z51 are True or False. Therefore, for example, if {z11, z12, z13, z31, z51 }=(1, 0, 0, 0, 0) holds for the second access request, the inclusion relation determination unit 140 can determine that the second access request does not satisfy the access permission condition, based on the decision information related to the first access request and stored in the decision storage 135. That is, the inclusion relation determination unit 140 determines that the access request does not satisfy the access permission condition if the decision information stored in the decision storage 135 has a second inclusion relation with the access request when a decision about the access request in relation to at least one of the subconditions differs from a decision related to the subcondition and contained in the decision information, where the second inclusion relation is a relation in which any of the subconditions not satisfied in the decision information is satisfied by the access request and the access permission condition is not satisfied in the decision information. According to this embodiment, when the decision information has the second inclusion relation with the access request, it is said that the set Zts of decisions related to the plurality of subconditions and contained in the decision information includes a set Zts" of decisions about the access request in relation to the plurality of subconditions.

FIG. 4 shows an example of the decision storage 135 according to this embodiment in a tabular form. The decision storage 135 stores decision information about one or more decisions made by the policy determination unit 180 as to whether an access permission condition is satisfied. According to this embodiment, the decision storage 135 stores the following information by associating them with one another: namely, information about the user u, purpose of use p, type of data t, and decisions zij concerning the plurality of subconditions contained in the access-permission-condition-based determination request sent from the decision acquisition unit 145 to the policy determination unit 180; information about the decision F (u, p, t, s) made in relation to the access permission condition in response to the access-permission-condition-based determination request; and inclusion relation determination information v which indicates whether the decision information deleting unit 160 has determined an inclusion relation with other decision information.

When the decision acquisition unit 145 receives a decision as to whether an access request satisfies an access permission condition, the decision update unit 155 stores the decision information about the access request in the decision storage 135. Then, if first decision information stored in the decision storage 135 has the first inclusion relation or second inclusion relation with second decision information, the decision information deleting unit 160 deletes the second decision information from the decision storage 135. Consequently, the decision information deleting unit 160 can reduce the quantity of decision information in the decision storage 135, making it faster for the inclusion relation determination unit 140 to determine inclusion relations.

The decision information deleting unit 160 according to this embodiment uses the inclusion relation determination information to speed up the process described above. Specifically, when the decision acquisition unit 145 receives a decision as to whether an access request satisfies an access permission condition, the decision update unit 155 stores the decision information about the access request in the decision storage 135, with the inclusion relation determination information set to 0 to indicate that the inclusion relation has not been determined. Then, if a first decision information newly stored in the decision storage 135 by the decision update unit 155 and yet to be subjected to inclusion relation determination has the first inclusion relation or second inclusion relation with a second decision information which has been stored in the decision storage 135 earlier and has undergone inclusion relation determination, the decision information deleting unit 160 deletes the second decision information from the decision storage 135. On the other hand, if a second decision information which has been stored in the decision storage 135 earlier and has undergone inclusion relation determination has the first inclusion relation or second inclusion relation with a first decision information newly stored in the decision storage 135 by the decision update unit 155 and yet to be subjected to inclusion relation determination, the decision information deleting unit 160 deletes the first decision information from the decision storage 135. Then, the decision information deleting unit 160 sets the inclusion relation determination information about any decision information to 1 after the decision information has its inclusion relations determined with respect to all the decision information whose inclusion relation determination information is 1.

Through the process described above, based on the inclusion relation determination information, the decision information deleting unit 160 can determine inclusion relations by efficiently selecting decision information whose inclusion relations with another decision information have yet to be determined from among the decision information stored in the decision storage 135 by the decision update unit 155.

When the quantity of decision information stored in the decision storage 135 exceeds a preset limit, the decision information deleting unit 160 may delete the earliest decision information to have been last judged as having the first inclusion relation or second inclusion relation with the access request from the decision storage 135.

Alternatively, the decision information deleting unit 160 may delete decision information which contains a True decision concerning an access permission condition and the smallest number of False decisions concerning a plurality of subconditions as well as decision information which contains a False decision concerning an access permission condition and the largest number of False decisions concerning a plurality of subconditions, from the decision storage 135. Consequently, the decision information deleting unit 160 can preferentially retain decision information which covers a larger number of decision patterns concerning a plurality of subconditions, in the decision storage 135.

Also, to obtain decision information which covers a larger number of decision patterns concerning a plurality of subconditions when an access permission condition for an access request gives a True decision, the decision acquisition unit 145 may send an access-permission-condition-based determination request to the policy determination unit 180 by changing at least one subcondition for the access request from true to false.

More specifically, upon receiving a decision that the access permission condition is satisfied from the policy determination apparatus 170 in response to a first access-permission-condition-based determination request, the decision acquisition unit 145 sends a second access-permission-condition-based determination request to the policy determination apparatus 170 by substituting at least one decision which indicates that a given subcondition is satisfied among decisions related to the plurality of subconditions and contained in the first access-permission-condition-based determination request with a decision which indicates that the given subcondition is not satisfied.

Upon receiving a decision that the access permission condition is not satisfied in response to the second access-permission-condition-based determination request, the decision update unit 155 stores the decision information in the decision storage 135 by associating the decisions concerning the plurality of subconditions reached in relation to the first access-permission-condition-based determination request with the decision concerning the access permission condition reached in relation to the first access-permission-condition-based determination request, and upon receiving a decision that the access permission condition is satisfied in response to the second access-permission-condition-based determination request, the decision update unit 155 stores the decision information in the decision storage 135 by associating the decisions concerning the plurality of subconditions reached in relation to the second access-permission-condition-based determination request with the decision concerning the access permission condition reached in relation to the second access-permission-condition-based determination request.

Similarly, to obtain decision information which covers a larger number of decision patterns concerning a plurality of subconditions when an access permission condition for an access request gives a False decision, the decision acquisition unit 145 may send an access-permission-condition-based determination request to the policy determination unit 180 by changing at least one subcondition for the access request from false to true.

More specifically, upon receiving a decision that the access permission condition is not satisfied from the policy determination apparatus 170 in response to a first access-permission-condition-based determination request, the decision acquisition unit 145 sends a second access-permission-condition-based determination request to the policy determination apparatus 170 by substituting at least one decision which indicates that a given subcondition is not satisfied among decisions related to the plurality of subconditions and contained in the first access-permission-condition-based determination request with a decision which indicates that the given subcondition is satisfied.

Upon receiving a decision that the access permission condition is satisfied in response to the second access-permission-condition-based determination request, the decision update unit 155 stores the decision information in the decision storage 135 by associating the decisions concerning the plurality of subconditions reached in relation to the first access-permission-condition-based determination request with the decision concerning the access permission condition reached in relation to the first access-permission-condition-based determination request, and upon receiving a decision that the access permission condition is not satisfied in response to the second access-permission-condition-based determination request, the decision update unit 155 stores the decision information in the decision storage 135 by associating the decisions concerning the plurality of subconditions reached in relation to the second access-permission-condition-based determination request with the decision concerning the access permission condition reached in relation to the second access-permission-condition-based determination request.

As described above, when a decision as to whether an access request satisfies an access permission condition is received, the inclusion relation determination unit 140 tries to obtain decision information which covers a larger number of decision patterns, allowing the access administration apparatus 120 to reduce the possibility of sending an access-permission-condition-based determination request to the policy determination apparatus 170 after receiving an access request. This makes it possible to reduce response time required to process the access request.

Incidentally, instead of sending subcondition functions which prescribe the respective subconditions Cij to the subcondition-based determination unit 130, the subcondition transmitting unit 175 may send the subcondition-based determination unit 130 the subcondition functions which prescribe the subconditions contained in statements which make at least one of determination functions such as data type determination function Ti true. This can reduce traffic between the access administration apparatus 120 and policy determination apparatus 170 compared to when all the subcondition functions and decisions as to whether the subconditions are satisfied are exchanged between the access administration apparatus 120 and policy determination apparatus 170.

Figure 5:
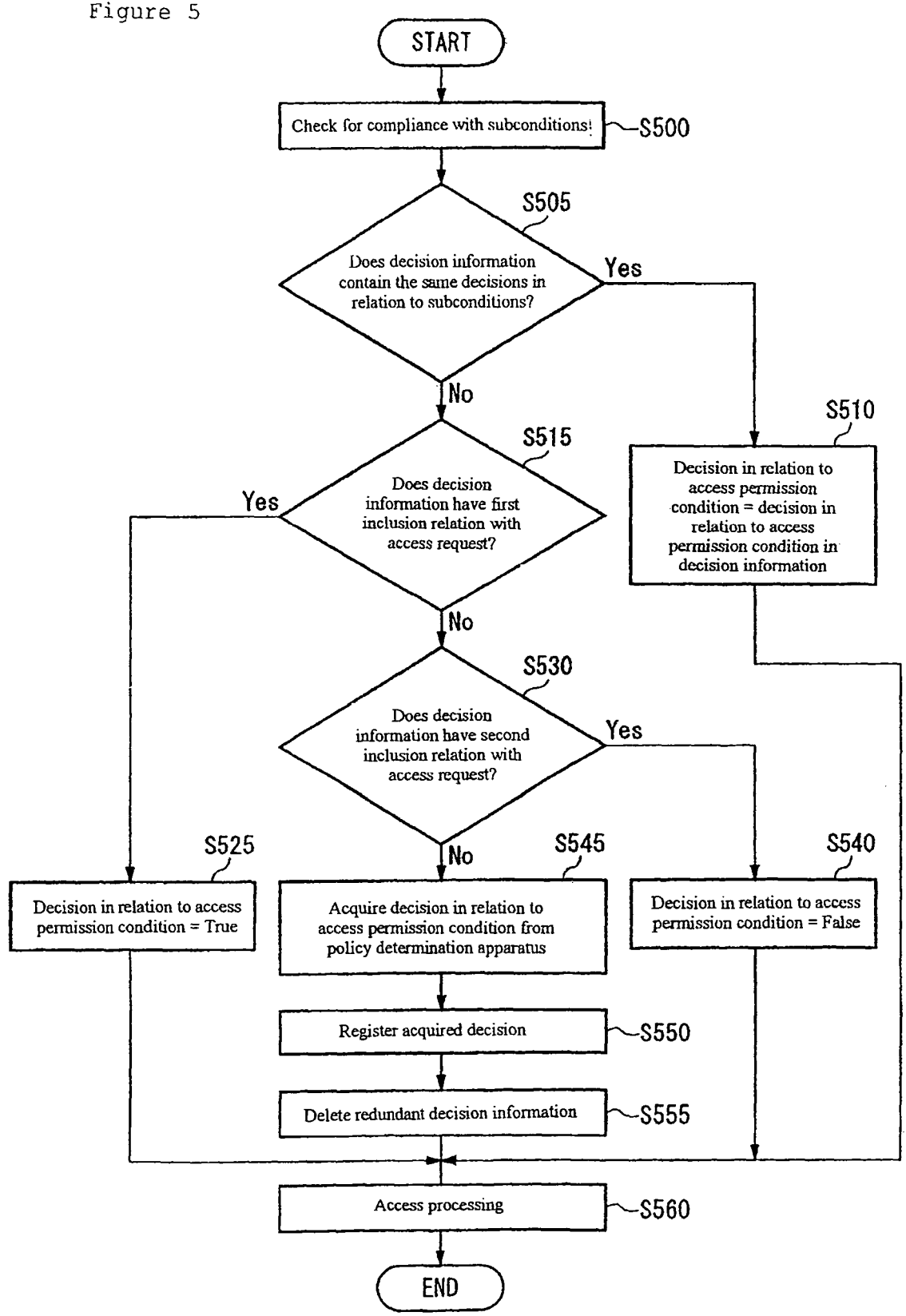
FIG. 5 shows a flow of access processing performed by the access management system 10 according to this embodiment.

FIG. 5 shows a flow of access processing performed by the access management system 10 according to this embodiment.

When the access administration apparatus 120 receives an access request from the access requesting apparatus 110, the subcondition-based determination unit 130 outputs decisions as to whether the access request satisfies each of the plurality of subconditions (Step S500). Then, assuming that determination conditions other than the plurality of subconditions are fixed, if inclusion relation determination unit 140 stored in the decision storage 135 contains the same decisions with respect to all the subconditions as the decisions about this access request (S505: Yes), the inclusion relation determination unit 140 uses the decision with respect to the access permission condition in the decision information as the decision about this access request with respect to the access permission condition and the flow goes to S560 (S510). Similarly, in comparing an access request and subconditions in decision information, it is assumed below that determination conditions other than the plurality of subconditions are fixed.

When a decision about the access request in relation to at least one of the subconditions differs from a decision related to the subcondition and contained in the decision information (S505: No), if the decision information about at least one decision stored in the decision storage 135 has the first inclusion relation with the access request (S515: Yes), the inclusion relation determination unit 140 determines that the access request satisfies the access permission condition and the flow goes to S560 (S525).

On the other hand, when a decision about the access request in relation to at least one of the subconditions differs from a decision related to the subcondition and contained in the decision information (S505: No), if the decision information about at least one decision stored in the decision storage 135 has the second inclusion relation with the access request (S530: Yes), the inclusion relation determination unit 140 determines that the access request does not satisfy the access permission condition and the flow goes to S560 (S540).

If it is determined that the decision information has neither the first inclusion relation nor the second inclusion relation with the access request (S515: No; S530: No), the decision acquisition unit 145 sends an access-permission-condition-based determination request concerning the access request to the policy determination apparatus 170 and receives a decision as to whether the access request satisfies the access permission condition from the policy determination apparatus 170 (S545).

When the decision acquisition unit 145 receives the decision as to whether the access request satisfies the access permission condition, the decision update unit 155 stores the decision information about the access request in the decision storage 135 (S550). Then if the decision information newly stored in the decision storage 135 and decision information stored in the decision storage 135 have the first inclusion relation or second inclusion relation, the decision information deleting unit 160 deletes the included decision information (S555).

After the process of S510, S525, S540, or S555, if the inclusion relation determination unit 140 or the policy determination unit 180 of the policy determination apparatus 170 determines that the access request satisfies the access permission condition, the access processor 150 permits access to the database 100 in response to the access request. Then, based on the access request, the access processor 150 accesses the database 100 and sends the results to the access requesting apparatus 110 (S560).

With the access management system 10 described above, if the access administration apparatus 120 receives a plurality of access requests with the same (u, p, t) and different subjects s, when the policy determination unit 180 determines whether a first access request satisfies an access permission condition, decision information about the first access request is stored in the decision storage 135. Then, if this decision information has the first inclusion relation or second inclusion relation with a second access request, the second access request can be checked for compliance with the access permission condition within the access administration apparatus 120.

More specifically, if a first access request for first personal information and a second access request for second personal information are received from the same access requester, then the subcondition-based determination unit 130 outputs, in S500, decisions, made based on the first personal information, as to whether the first access request satisfies each of the plurality of subconditions and decisions, made based on the second personal information, as to whether the second access request satisfies each of the plurality of subconditions. Then, in S545, the decision acquisition unit 145 sends an access-permission-condition-based determination request concerning the first access request to the policy determination apparatus 170 and receives a decision as to whether the first access request satisfies the access permission condition from the policy determination apparatus 170. Then, in S550, the decision update unit 155 stores decision information in the decision storage 135 by associating the decisions as to whether the plurality of subconditions are satisfied by the first access request with the decision as to whether the access permission condition is satisfied by the first access request.

Then, in S515 and S525, if a decision about the second access request in relation to at least one of the subconditions differs from a decision about the first access request related to the subcondition and contained in the decision information and if the decision information has the first inclusion relation with the first access request, the inclusion relation determination unit 140 determines that the second access request satisfies the access permission condition. Also, in S530 and S540, if a decision about the second access request in relation to at least one of the subconditions differs from a decision about the first access request related to the subcondition and contained in the decision information and if the decision information has the second inclusion relation with the first access request, the inclusion relation determination unit 140 determines that the second access request does not satisfy the access permission condition. Consequently, regarding the second access request, the access processor 150 can process access to the database 100 based on the decision made by the inclusion relation determination unit 140 in relation to the access permission condition.

Accesses for the same user u, purpose of use p, and type of data t and different subjects s as described above involve the process of acquiring the same items of personal information about a plurality of individuals from the database 100. An example of such a process is a case in which a sales representative acquires personal information such as mail addresses of individuals to send direct mail. The access management system 10 according to this embodiment can reduce the number of times the policy determination apparatus 170 determines whether an access permission condition is satisfied, and thus can prevent the policy determination apparatus 170 from becoming a bottleneck.

More specifically, to determine all the access requests that satisfy an access permission condition within the access administration apparatus 120, the access administration apparatus 120 must store, in the decision storage 135, at least as many pieces of decision information as there are terms (which are radd in number) when the access permission condition is expressed in disjunctive normal form. Similarly, to determine all the access requests that do not satisfy an access permission condition within the access administration apparatus 120, the access administration apparatus 120 must store, in the decision storage 135, at least as many pieces of decision information as there are terms (which are rmulti in number) when the access permission condition is expressed in conjunctive normal form. Thus, once the access management system 10 makes the policy determination apparatus 170 check for compliance with the access permission condition "radd+rmulti" times at the minimum, all the access requests which has the same (u, p, t) can be checked for compliance with the access permission condition within the access administration apparatus 120. The minimum number of times compliance with the access permission condition is checked is generally far smaller than the quantity of personal information or the number of combinations of subconditions. Consequently, the access management system 10 can greatly reduce the number of times the policy determination apparatus 170 checks for compliance with the access permission condition even if the policy determination apparatus 170 actually checks for compliance extra times.

Incidentally, the inclusion relation determination unit 140 may be designed to perform only the processes in S515 and S525 or the processes in S530 and S540.

Figure 6:
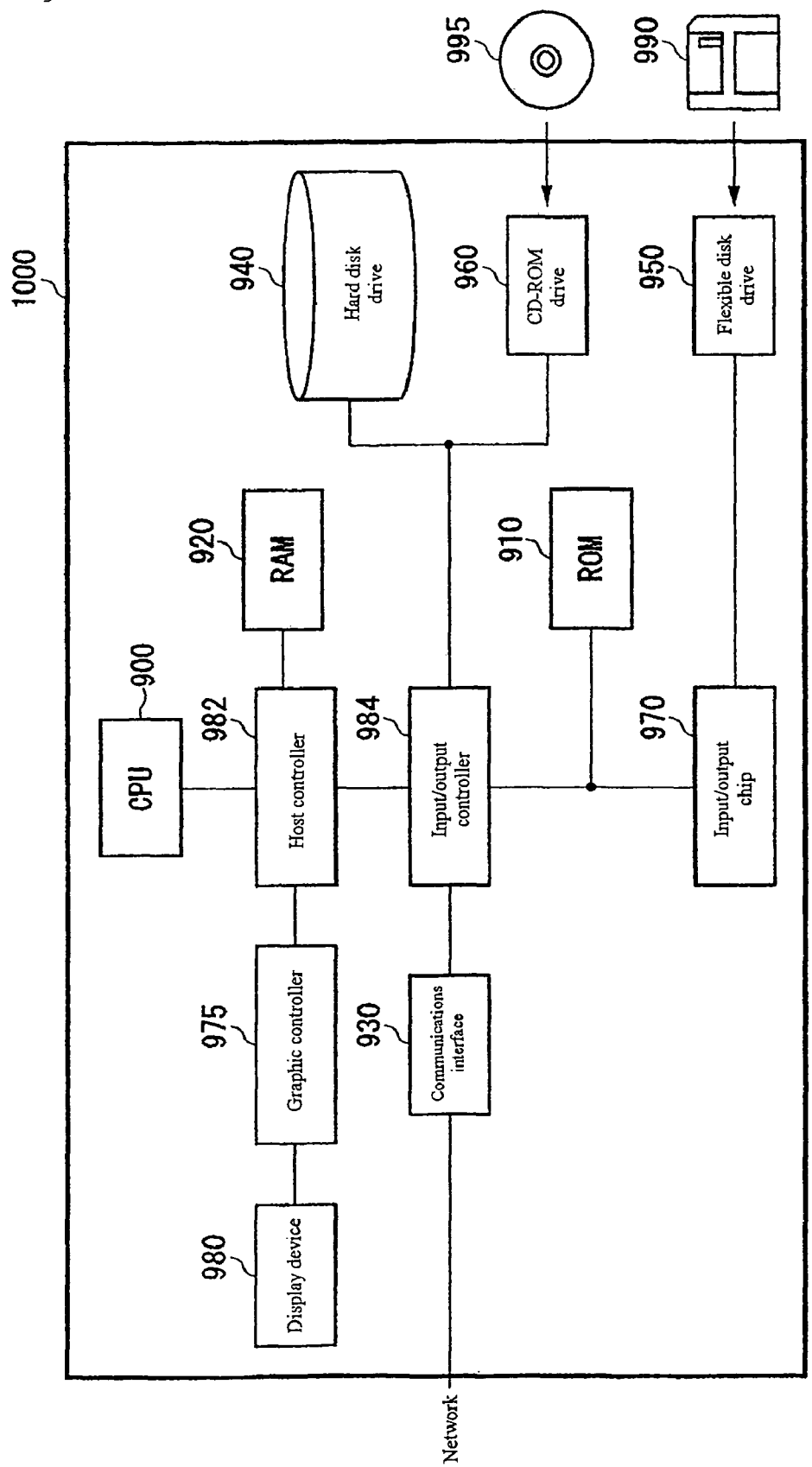
FIG. 6 shows an exemplary hardware configuration of a computer 1000 according to this embodiment.

FIG. 6 shows an exemplary hardware configuration of a computer 1000 according to this embodiment. The computer 1000 according to this embodiment comprises a CPU peripheral portion which includes a CPU 900, RAM 920, graphic controller 975, and display device 980 which are interconnected via a host controller 982; input/output portion which includes a communications interface 930, hard disk drive 940, and CD-ROM drive 960 connected to the host controller 982 via an input/output controller 984; and legacy input/output portion which includes a ROM 910, flexible disk drive 950, and input/output chip 970 connected to the input/output controller 984.

The host controller 982 connects the RAM 920 with the CPU 900 and graphic controller 975 which access the RAM 920 at a high transfer rate. The CPU 900 operates based on programs stored in the ROM 910 and RAM 920 and controls various parts. The graphic controller 975 acquires image data generated by the CPU 900 and the like in a frame buffer provided in the RAM 920 and displays it on the display device 980. Alternatively, the graphic controller 975 may contain a frame buffer to store the image data generated by the CPU 900 and the like.

The input/output controller 984 connects the host controller 982 with the communications interface 930, the hard disk drive 940, and the CD-ROM drive 960 which are relatively high-speed input/output devices. The communications interface 930 communicates with other devices via a network. The hard disk drive 940 stores programs and data for use by the CPU 900 in the computer 1000. The CD-ROM drive 960 reads programs or data from a CD-ROM 995 and provides them to hard disk drive 940 via the RAM 920.

The input/output controller 984 is connected with the ROM 910 as well as with relatively low-speed input/output devices such as the flexible disk drive 950 and the input/output chip 970. The ROM 910 stores a boot program executed by the CPU 900 during startup of the computer 1000, and programs dependent on hardware of the computer 1000. The flexible disk drive 950 reads programs or data from a flexible disk 990 and provides them to the hard disk drive 940 via the RAM 920. The input/output chip 970 connects with the flexible disk 950 as well as with various input/output devices via, for example, a parallel port, serial port, keyboard port, mouse port, etc.

The programs are supplied to the hard disk drive 940 via the RAM 920 by the operator, being stored on a recording medium such as a flexible disk 990, CD-ROM 995, or IC card. Then, the programs are read from the recording medium, installed on the hard disk drive 940 in the computer 1000 via the RAM 920, and executed by the CPU 900.

A program which is installed on the computer 1000 and makes the computer 1000 function as the access administration apparatus 120 comprises a subcondition-based determination module, decision management module which manages the decision storage 135, inclusion relation determination module, decision acquisition module, access processing module, decision update module, and decision information deleting module. These programs or modules make the computer 1000 function as the subcondition-based determination unit 130, decision storage 135, inclusion relation determination unit 140, decision acquisition unit 145, access processor 150, decision update unit 155, and decision information deleting unit 160, respectively.

A program which is installed on the computer 1000 and makes the computer 1000 function as the policy determination apparatus 170 comprises a subcondition transmitting module and policy determination module. These programs or modules make the computer 1000 function as the subcondition transmitting unit 175 and policy determination unit 180, respectively.

The programs or modules described above may be stored on an external storage medium. The storage medium may be not only the flexible disk 990 or CD-ROM 995, but also an optical recording medium such as a DVD or PD, magneto-optical recording medium such as an MD, tape medium, or semiconductor memory such as an IC card. Alternatively, a storage device such as a hard disk or RAM installed in a server system connected to a private communications network or the Internet may be used as a recording medium and the control programs may be supplied to the computer 1000 via the network.

The present invention has been described above by way of an embodiment, but the technical scope of the present invention is not limited to the scope of the embodiment described above. As will be understood by those skilled in the art, various modifications or improvements can be made to the embodiment described above. It is obvious from the appended Claims that results of such modifications or improvements can also be included in the technical scope of the present invention.

The embodiment described above implements an access management system which accesses a database based on a request to access the database when the access request satisfies a predetermined access permission condition.

(Item 1) An access management system which accesses a database based on a request to access the database when the access request satisfies a predetermined access permission condition, wherein: the access permission condition is satisfied if all the subconditions contained in a predetermined first set of subconditions are satisfied from among a plurality of subconditions which are elements of the access permission condition; the access management system comprises: an access administration apparatus which receives the access request and permits access to the database when the access request satisfies the access permission condition, and a policy determination apparatus which receives, from the access administration apparatus, an access-permission-condition-based determination request containing decisions as to whether the plurality of subconditions are satisfied by the access request and returns a decision as to whether the access permission condition is satisfied by the access request; and the access administration apparatus comprises: a decision storage which stores decision information by associating the decisions related to the plurality of subconditions with a corresponding decision related to the access permission condition of the decisions, a subcondition-based determination unit which outputs decisions as to whether the access request satisfies each of the plurality of subconditions, an inclusion relation determination unit which determines that the access request satisfies the access permission condition if the decision information has a first inclusion relation with the access request when a decision about the access request in relation to at least one of the subconditions differs from a decision related to the subcondition and contained in the decision information, where the first inclusion relation is a relation in which all the subconditions satisfied in the decision information are satisfied by the access request and the access permission condition is satisfied in the decision information, a decision acquisition unit which sends the access-permission-condition-based determination request to the policy determination apparatus and receives a decision as to whether the access permission condition is satisfied by the access request from the policy determination apparatus if it is determined that the decision information does not have the first inclusion relation with the access request, and an access processor which permits access to the database if it is determined that the access request satisfies the access permission condition.

(Item 2) The access management system according to item 1, wherein: the access permission condition is not satisfied unless all the subconditions contained in a predetermined second set of subconditions are satisfied from among a plurality of subconditions which are elements of the access permission condition; the inclusion relation determination unit further determines that the access request does not satisfy the access permission condition if the decision information has a second inclusion relation with the access request when a decision about the access request in relation to at least one of the subconditions differs from a decision related to the subcondition and contained in the decision information, where the second inclusion relation is a relation in which any of the subconditions not satisfied in the decision information is not satisfied by the access request either and the access permission condition is not satisfied in the decision information, and the decision acquisition unit sends the access-permission-condition-based determination request to the policy determination apparatus and receives a decision as to whether the access permission condition is satisfied by the access request from the policy determination apparatus if it is determined that the decision information does not have either a first inclusion relation or second inclusion relation with the access request.

(Item 3) The access management system according to item 1, wherein the access administration apparatus further comprises a decision update unit which stores the decision information in the decision storage by associating the decisions as to whether the plurality of subconditions are satisfied by the access request with a decision as to whether the access permission condition is satisfied by the access request when the decision acquisition unit receives a decision as to whether the access permission condition is satisfied by the access request.

(Item 4) The access management system according to item 1, wherein the access administration apparatus further comprises a decision information deleting unit which deletes second decision information from the decision storage if the first decision information has the first inclusion relation with the second decision information.

(Item 5) The access management system according to item 4, wherein the decision information deleting unit deletes the second decision information from the decision storage if the first decision information newly stored in the decision storage by the decision update unit has the first inclusion relation with the second decision information among the decision information stored earlier than the first decision information in the decision storage.

(Item 6) The access management system according to item 4, wherein the decision information deleting unit deletes the first decision information from the decision storage if the second decision information newly stored in the decision storage by the decision update unit has the first inclusion relation with the first decision information among the decision information stored earlier than the second decision information in the decision storage.

(Item 7) The access management system according to item 3, wherein: the database stores personal information about a plurality of individuals; when a first access request for first personal information and a second access request for second personal information are received from the same access requester, the subcondition-based determination unit outputs decisions reached by determining, based on the first personal information, whether the first access request satisfies each of the plurality of subconditions and decisions reached by determining, based on the second personal information, whether the second access request satisfies each of the plurality of subconditions; the decision acquisition unit sends access-permission-condition-based determination request concerning the first access request to the policy determination apparatus and receives a decision as to whether the access permission condition is satisfied by the first access request from the policy determination apparatus; the decision update unit stores the decision information in the decision storage by associating the decisions as to whether the first access request satisfies the plurality of subconditions with a decision as to whether the first access request satisfies the access permission condition; and the inclusion relation determination unit determines that the second access request satisfies the access permission condition if a decision about the second access request in relation to at least one of the subconditions differs from a decision about the first access request related to the subcondition and contained in the decision information and if the decision information has the first inclusion relation with the first access request.

(Item 8) The access management system according to item 1, wherein: upon receiving a decision that the access permission condition is satisfied from the policy determination apparatus in response to a first access-permission-condition-based determination request, the decision acquisition unit sends a second access-permission-condition-based determination request to the policy determination apparatus by substituting at least one decision which indicates that a given subcondition is satisfied among decisions related to the plurality of subconditions and contained in the first access-permission-condition-based determination request with a decision which indicates that the given subcondition is not satisfied; and the access administration apparatus further comprises a decision update unit which, upon receiving a decision that the access permission condition is not satisfied in response to the second access-permission-condition-based determination request, stores the decision information in the decision storage by associating the decisions concerning the plurality of subconditions reached in relation to the first access-permission-condition-based determination request with the decision concerning the access permission condition reached in relation to the first access-permission-condition-based determination request, and upon receiving a decision that the access permission condition is satisfied in response to the second access-permission-condition-based determination request, stores the decision information in the decision storage by associating the decisions concerning the plurality of subconditions reached in relation to the second access-permission-condition-based determination request with the decision concerning the access permission condition reached in relation to the second access-permission-condition-based determination request.

(Item 9) An access management system which accesses a database based on a request to access the database when the access request satisfies a predetermined access permission condition, wherein: the access permission condition is not satisfied unless all the subconditions contained in a predetermined second set of subconditions are satisfied from among a plurality of subconditions which are elements of the access permission condition; the access management system comprises: an access administration apparatus which receives the access request and permits access to the database when the access request satisfies the access permission condition, and a policy determination apparatus which receives, from the access administration apparatus, an access-permission-condition-based determination request containing decisions as to whether the plurality of subconditions are satisfied by the access request and returns a decision as to whether the access permission condition is satisfied by the access request; and the access administration apparatus comprises: a decision storage which stores decision information by associating the decisions related to the plurality of subconditions with a corresponding decision related to the access permission condition, a subcondition-based determination unit which outputs decisions as to whether the access request satisfies each of the plurality of subconditions, an inclusion relation determination unit which determines that the access request does not satisfy the access permission condition if the decision information has a second inclusion relation with the access request when a decision about the access request in relation to at least one of the subconditions differs from a decision related to the subcondition and contained in the decision information, where the second inclusion relation is a relation in which any of the subconditions not satisfied in the decision information is not satisfied by the access request either and the access permission condition is not satisfied in the decision information, a decision acquisition unit which sends the access-permission-condition-based determination request to the policy determination apparatus and receives a decision as to whether the access permission condition is satisfied by the access request from the policy determination apparatus if it is determined that the decision information does not have the second inclusion relation with the access request, and an access processor which permits access to the database if it is determined that the access request satisfies the access permission condition.

(Item 10) An access administration apparatus which receives a request to access a database and permits access to the database when the access request satisfies a predetermined access permission condition in an access management system which accesses the database based on the access request when the access request satisfies the access permission condition, wherein: the access permission condition is satisfied if all the subconditions contained in a predetermined first set of subconditions are satisfied from among a plurality of subconditions which are elements of the access permission condition; the access management system comprises a policy determination apparatus which receives, from the access administration apparatus, an access-permission-condition-based determination request containing decisions as to whether the plurality of subconditions are satisfied by the access request and returns a decision as to whether the access permission condition is satisfied by the access request; and the access administration apparatus comprises: a decision storage which stores decision information by associating the decisions related to the plurality of subconditions with a corresponding decision related to the access permission condition, a subcondition-based determination unit which outputs decisions as to whether the access request satisfies each of the plurality of subconditions, an inclusion relation determination unit which determines that the access request satisfies the access permission condition if the decision information has a first inclusion relation with the access request when a decision about the access request in relation to at least one of the subconditions differs from a decision related to the subcondition and contained in the decision information, where the first inclusion relation is a relation in which all the subconditions satisfied in the decision information are satisfied by the access request and the access permission condition is satisfied in the decision information, a decision acquisition unit which sends the access-permission-condition-based determination request to the policy determination apparatus and receives a decision as to whether the access permission condition is satisfied by the access request from the policy determination apparatus if it is determined that the decision information does not have the first inclusion relation with the access request, and an access processor which permits access to the database if it is determined that the access request satisfies the access permission condition.

(Item 11) An access administration program for making a computer function as an access administration apparatus which receives a request to access a database and permits access to the database when the access request satisfies a predetermined access permission condition in an access management system which accesses the database based on the access request when the access request satisfies the access permission condition, wherein: the access permission condition is satisfied if all the subconditions contained in a predetermined first set of subconditions are satisfied from among a plurality of subconditions which are elements of the access permission condition; the access management system comprises a policy determination apparatus which receives, from the access administration apparatus, an access-permission-condition-based determination request containing decisions as to whether the plurality of subconditions are satisfied by the access request and returns a decision as to whether the access permission condition is satisfied by the access request; the access administration program makes the computer function as: a decision storage which stores decision information by associating the decisions related to the plurality of subconditions with a corresponding decision related to the access permission condition, a subcondition-based determination unit which outputs decisions as to whether the access request satisfies each of the plurality of subconditions, an inclusion relation determination unit which determines that the access request satisfies the access permission condition if the decision information has a first inclusion relation with the access request when a decision about the access request in relation to at least one of the subconditions differs from a decision related to the subcondition and contained in the decision information, where the first inclusion relation is a relation in which all the subconditions satisfied in the decision information are satisfied by the access request and the access permission condition is satisfied in the decision information, a decision acquisition unit which sends the access-permission-condition-based determination request to the policy determination apparatus and receives a decision as to whether the access permission condition is satisfied by the access request from the policy determination apparatus if it is determined that the decision information does not have the first inclusion relation with the access request, and an access processor which permits access to the database if it is determined that the access request satisfies the access permission condition.

(Item 12) An access administration method for making a computer control an access administration apparatus which receives a request to access a database and permits access to the database when the access request satisfies a predetermined access permission condition in an access management system which accesses the database based on the access request when the access request satisfies the access permission condition, wherein: the access permission condition is satisfied if all the subconditions contained in a predetermined first set of subconditions are satisfied from among a plurality of subconditions which are elements of the access permission condition; the access management system comprises a policy determination apparatus which receives, from the access administration apparatus, an access-permission-condition-based determination request containing decisions as to whether the plurality of subconditions are satisfied by the access request and returns a decision as to whether the access permission condition is satisfied by the access request; the access administration method comprises: a decision storage step of making the computer store decision information by associating the decisions related to the plurality of subconditions with a corresponding decision related to the access permission condition, a subcondition-based determination step of making the computer output decisions as to whether the access request satisfies each of the plurality of subconditions, an inclusion relation determination step of making the computer determine that the access request satisfies the access permission condition if the decision information has a first inclusion relation with the access request when a decision about the access request in relation to at least one of the subconditions differs from a decision related to the subcondition and contained in the decision information, where the first inclusion relation is a relation in which all the subconditions satisfied in the decision information are satisfied by the access request and the access permission condition is satisfied in the decision information, a decision acquisition step of making the computer send the access-permission-condition-based determination request to the policy determination apparatus and receive a decision as to whether the access permission condition is satisfied by the access request from the policy determination apparatus if it is determined that the decision information does not have the first inclusion relation with the access request, and an access processing step of making the computer permit access to the database if it is determined that the access request satisfies the access permission condition.

(Item 13) An access administration program for making a computer function as an access administration apparatus which receives a request to access a database and permits access to the database when the access request satisfies a predetermined access permission condition in an access management system which accesses the database based on the access request when the access request satisfies the access permission condition, wherein: the access permission condition is not satisfied unless all the subconditions contained in a predetermined second set of subconditions are satisfied from among a plurality of subconditions which are elements of the access permission condition; the access management system comprises a policy determination apparatus which receives, from the access administration apparatus, an access-permission-condition-based determination request containing decisions as to whether the plurality of subconditions are satisfied by the access request and returns a decision as to whether the access permission condition is satisfied by the access request; and the access administration program makes the computer function as: a decision storage which stores decision information by associating the decisions related to the plurality of subconditions with a corresponding decision related to the access permission condition, a subcondition-based determination unit which outputs decisions as to whether the access request satisfies each of the plurality of subconditions, an inclusion relation determination unit which determines that the access request does not satisfy the access permission condition if the decision information has a second inclusion relation with the access request when a decision about the access request in relation to at least one of the subconditions differs from a decision related to the subcondition and contained in the decision information, where the second inclusion relation is a relation in which any of the subconditions not satisfied in the decision information is not satisfied by the access request either and the access permission condition is not satisfied in the decision information, a decision acquisition unit which sends the access-permission-condition-based determination request to the policy determination apparatus and receives a decision as to whether the access permission condition is satisfied by the access request from the policy determination apparatus if it is determined that the decision information does not have the second inclusion relation with the access request, and an access processor which permits access to the database if it is determined that the access request satisfies the access permission condition.

(Item 14) An access administration method for making a computer control an access administration apparatus which receives a request to access a database and permits access to the database when the access request satisfies a predetermined access permission condition in an access management system which accesses the database based on the access request when the access request satisfies the access permission condition, wherein: the access permission condition is not satisfied unless all the subconditions contained in a predetermined second set of subconditions are satisfied from among a plurality of subconditions which are elements of the access permission condition; the access management system comprises a policy determination apparatus which receives, from the access administration apparatus, an access-permission-condition-based determination request containing decisions as to whether the plurality of subconditions are satisfied by the access request and returns a decision as to whether the access permission condition is satisfied by the access request; and the access administration method comprises: a decision storage step of making the computer store decision information by associating the decisions related to the plurality of subconditions with a corresponding decision related to the access permission condition, a subcondition-based determination step of making the computer output decisions as to whether the access request satisfies each of the plurality of subconditions, an inclusion relation determination step of making the computer determine that the access request does not satisfy the access permission condition if the decision information has a second inclusion relation with the access request when a decision about the access request in relation to at least one of the subconditions differs from a decision related to the subcondition and contained in the decision information, where the second inclusion relation is a relation in which any of the subconditions not satisfied in the decision information is not satisfied by the access request either and the access permission condition is not satisfied in the decision information, a decision acquisition step of making the computer send the access-permission-condition-based determination request to the policy determination apparatus and receive a decision as to whether the access permission condition is satisfied by the access request from the policy determination apparatus if it is determined that the decision information does not have the second inclusion relation with the access request, and an access processing step of making the computer permit access to the database if it is determined that the access request satisfies the access permission condition.

(Item 15) A recording medium containing the access administration program according to item 11 or 13.

[Description of Symbols]
10 . . . Access management system
100 . . . Database
110 . . . Access requesting apparatus
120 . . . Access administration apparatus
130 . . . Subcondition-based determination unit
135 . . . Decision storage
140 . . . Inclusion relation determination unit
145 . . . Decision acquisition unit
150 . . . Access processor
155 . . . Decision update unit
160 . . . Decision information deleting unit
170 . . . Policy determination apparatus
175 . . . Subcondition transmitting unit
180 . . . Policy determination unit
190 . . . Authentication apparatus
900 . . . CPU
910 . . . ROM
920 . . . RAM
930 . . . Communications interface
940 . . . Hard disk drive
950 . . . Flexible disk drive
960 . . . CD-ROM drive
970 . . . Input/output chip
975 . . . Graphic controller
980 . . . Display device
982 . . . Host controller
984 . . . Input/output controller
990 . . . Flexible disk
995 . . . CD-ROM
1000 . . . Computer

The invention claimed is:

1. An access administration system that accesses a database upon a second access request, following a first access request, said system comprising:
a computer, wherein said computer comprises:
an access requesting apparatus of said computer that provides said first and second access requests, each of said first and second access requests being associated with a set of conditions, each of said set of conditions including a condition having a plurality of positive subconditions linked only by a Boolean operator of either a conjunctive, AND, or a disjunctive, OR;
a policy determination apparatus of said computer;
an access processor of said computer that permits access to said database; and an access administration apparatus of said computer comprising:
a decision storage unit of said computer that stores a first set of decisions associated with said first access request, said first set of decisions corresponding to satisfaction of each of a plurality of first subconditions and to satisfaction of said
predetermined accession permission condition,
wherein said predetermined access permission condition corresponds to a predetermined set of conditions, each of said predetermined set of conditions including a predetermined condition having a predetermined plurality of positive subconditions linked only by a Boolean operator of either a conjunctive, AND, or a disjunctive, OR;
a subcondition-based determination unit of said computer that receives said second access request and determines whether each of a plurality of second subconditions, associated with said second access request, is satisfied;
an inclusion relation determination unit of said computer that receives a second set of decisions, corresponding to satisfaction of said each of said plurality of second subconditions, from said subcondition-based determination unit, said inclusion relation determination unit determining whether said second set of decisions is logically included by said first set of decisions, wherein said second set of decisions differs from said first set of decisions by satisfaction of at least one of said plurality of subconditions;
and a decision acquisition unit of said computer that communicates with said access processor to permit access to said database, if said second set of decisions is logically included by said first set of decisions, and that sends said second set of decisions to said policy determination apparatus, if said second set of decisions is not logically included by said first set of decisions, receives a decision as to whether said second set of decisions satisfies said predetermined accession permission condition from said policy determination apparatus, and communicates said decision to said access processor, wherein said policy determination apparatus determines whether said second set of decisions is logically included by said predetermined accession permission condition.

2. The access administration system according to claim 1, wherein said set of conditions corresponds to at least user groups, purposes, types of data, and usage conditions.

3. An access administration system that accesses a database upon a second access request, following a first access request, said system comprising;
a computer, said computer comprising;
an access requesting apparatus of said computer that provides said first and second access requests, each of said first and second access requests being associated with a set of conditions, each of said set of conditions including a condition having a plurality of positive subconditions linked only by a Boolean operator of either a conjunctive, AND, or a disjunctive, OR;
a policy determination apparatus of said computer;
an access processor of said computer that permits access to said database;
and an access administration apparatus of said computer comprising;
a decision storage unit of said computer that stores a first set of decisions associated with said first access request, said first set of decisions corresponding to satisfaction of each of a plurality of first subconditions, wherein said predetermined access permission condition corresponds to a predetermined set of conditions, each of said predetermined set of conditions including a predetermined condition having a predetermined plurality of positive subconditions linked only by a Boolean operator of either n conjunctive, AND, or a disjunctive, OR;
a subcondition-based determination unit of said computer that receives said second access request and determines whether each of a plurality of second subconditions, associated with said second access request, is satisfied;
an inclusion relation determination unit of said computer that retrieves a second set of decisions, corresponding to satisfaction of said each of said plurality of second subconditions from said subcondition-based determination unit, said inclusion relation determination unit determining whether said second set of decisions is logically included by said first set of decisions, wherein if said second set of decisions is logically included by said first set of decisions and said first set of decisions satisfies said predetermined accession permission condition, then a first inclusion relation exists between said second access request and said first access request, wherein if said second set of decisions is included logically by said first set of decisions and said first set of decisions does not satisfy said predetermined accession permission condition, then a second inclusion relation exists between said second access request and said first access request, and wherein said second set of decisions differ from said first set of decisions by satisfaction of at least one of said plurality of subconditions; and a decision acquisition unit of said computer that communicates with said access processor to perform one of:

if said first inclusion relation exists between said second access request and said first access request, then permitting access to said database by said second access request;

if said second inclusion relation exists between said second access request and said first access request, then denying access to said database by said second access request; and if said second set of decisions is not logically included by said first set of decisions, then receiving a decision as to whether said second set of decisions satisfies said predetermined accession permission from said policy determination unit and communicating said decision to said access processor.

4. The access administration system according to claim 3, wherein said set of conditions corresponds to at least user groups, purposes, types of data, and usage conditions.

5. A computer-implemented method of accessing a database upon a second access request, following a first access request, said method comprising:

inputting, to a computer, said first and second access requests, each of said first and second access requests being associated with a set of conditions, each of said set of condition including a condition having a plurality of positive subconditions linked only by a Boolean operator of either a conjunctive, AND, or a disjunctive, OR;

storing, in a memory, a first set of decisions associated with said first access request, said first set of decisions: corresponding to satisfaction of each of a plurality of first subconditions and to satisfaction of said predetermined accession permission condition, wherein said predetermined access permission condition corresponds to a predetermined set of conditions, back of said predetermined set of conditions including a predetermined condition havin8 a predetermined plurality of positive subconditions linked only by a Boolean operation of either a conjunctive, AND, or a disjunctive, OR;

each of a plurality of second subconditions, associated with said second access request, is satisfied;

receiving, by said computer, a second set of decisions, corresponding to satisfaction of said each of said plurality of second subconditions and determining whether said second set of decisions is logically included by said first set of decisions, wherein said second set of decisions differs form said first set of decisions by satisfaction of at least one of said plurality of subconditions; and permitting, by said computer, access to said database, if said second set of decisions is logically included by said first set of decisions, and determining, by said computer, if access is to be permitted to said database according to a policy, if said second set of decisions is not totally included by said first set of decisions, wherein said policy permits access if said second set of decisions is logically included by said predetermined accession permission condition, otherwise access is not permitted.

6. The method according to claim 5, wherein said set of conditions corresponds to at least user groups, purposes, types of data, and usage conditions.

7. A computer-implemented method of accessing a database upon a second access request, following a first access request, said method comprising:

inputting, to a computer, said first and second access requests, each of said first and second access requests being associated with a set of conditions, each of said set of conditions including a condition having a plurality of positive subconditions linked only by a Boolean operator of either a conjunctive, AND, or a disjunctive, OR;

storing, in a memory, a first set of decisions associated with said first access request, said first set of decisions corresponding to satisfaction of each of a plurality of first subconditions, wherein said predetermined access permission condition corresponds to a predetermined set of conditions, each of said predetermined set of conditions including a predetermined condition having a predetermined plurality of positive subconditions linked only by a Boolean operator of either a conjunctive, AND, or a disjunctive, OR;

receiving, by said computer, said second access request and determining whether each of a plurality of second subconditions, associated with said second access request, is satisfied;

receiving, by said computer, a second set of decisions, corresponding to satisfaction of said each of said plurality of second subconditions and determining whether said second set of decisions is logically included by said first set of decisions, wherein if said second set of decisions is logically included by said first set of decisions and said first set of decisions satisfies said predetermined accession permission condition, then a first inclusion relation exists between said second access request and said first access request, wherein if said second set of decision is included logically by said first set of decisions and said first set of decisions does not satisfy said predetermined accession permission condition, then a second inclusion relation exists between said second access request and said first access request, and wherein said second set of decisions differs from said first set of decisions by satisfaction of at least one of said plurality of subconditions;

performing, by said computer, one or permitting access to said database by said second access request, if said first inclusion relation exists between said second access request and said first access request;

denying access to said database by said second access request, if said second inclusion relation exists between said second access request and said first access request; and determining if access is to be permitted to said database by said second access request according to a policy, if said second set of decisions is not logically included by said first set of decision, wherein said policy permits access if said second set of decisions is logically included by said predetermined accession permission condition, otherwise access is not permitted.

8. The method according to claim 7, wherein said set of conditions corresponds to at least user groups, purposes, types of data, and usage conditions.

9. A computer program storage medium readable by a computer, tangibly embodying a program of instruction executable by said computer to perform a method of accessing database upon a second access request, following a first access request, said method comprising:

inputting, to a computer, said first and second access requests, each of said first and second access requests being associated with a set of conditions, each of said set of conditions including a condition having a plurality of positive subconditions linked only by a Boolean operator of either conjunctive, AND, or a disjunctive, OR;

storing, in a memory, a first set of decisions associated with said first access request said first set of decisions corresponding to satisfaction of each of a plurality of first subconditions, wherein said predetermined access permission condition corresponds to a predetermined set of conditions, each of said predetermined set of conditions including a predetermined condition having a predetermined plurality of positive subcondition linked only by a Boolean operator of either a corJunctive, AND, or a disjunctive, OR;

receiving, by said computer, said second access request and determining whether each of a plurality of second subconditions, associated with said second access request is satisfied;

receiving, by said computer, a second set of decisions, corresponding to satisfaction of said each of said plurality of second subconditions and determining whether said second set of decisions is logically included by said first set of decisions, wherein if said second set of decisions is logically included by said first set of decisions and said first set of decisions satisfies said predetermined accession permission condition, then a first inclusion relation exists between said second access request and said first access request wherein if said second set of decisions is included logically by said first set of decisions and said first set pf decisions does not satisfy said predetermined accession permission condition, then a second inclusion relation exists between said second access request and said first access request and wherein said second set of decisions differ from said first set of decisions by satisfaction of at least one of said plurality of subconditions;

performing, by said computer, one of:

permitting access to said database by said second access request, if said first inclusion relation exists between said second access request and said first access request;

denying access to said database by said second access request, if said second inclusion relation exists between said second access request and said first access request; and determining if access is to be permitted to said database by said second access request according to a policy, if said second set of decisions is not logically included by said first set of decisions, where said policy permits access if said second set of decisions is logically included by said predetermined accession permission condition, otherwise access is not permitted.

* * * * *

UNITED STATES PATENT AND TRADEMARK OFFICE
CERTIFICATE OF CORRECTION

PATENT NO. : 7,752,161 B2  Page 1 of 1
APPLICATION NO. : 10/958322
DATED : July 6, 2010
INVENTOR(S) : Watanabe et al.

It is certified that error appears in the above-identified patent and that said Letters Patent is hereby corrected as shown below:

Title Page; item (75); Please correct the first inventor's name as follows:

Yuji Watanabe

Signed and Sealed this

Second Day of November, 2010

David J. Kappos
*Director of the United States Patent and Trademark Office*